United States Patent
Aoyagi

(10) Patent No.: US 6,901,275 B1
(45) Date of Patent: May 31, 2005

(54) COMMUNICATION SYSTEM, AND COMMUNICATION DEVICE AND COMMUNICATION METHOD FOR USE IN THE COMMUNICATION SYSTEM

(75) Inventor: Kazunori Aoyagi, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 968 days.

(21) Appl. No.: 09/653,946

(22) Filed: Sep. 1, 2000

(30) Foreign Application Priority Data

Sep. 30, 1999 (JP) ............................................ 11-280649

(51) Int. Cl.⁷ .............................. H04B 1/38; H04B 7/00
(52) U.S. Cl. ................. 455/574; 455/343.5; 455/343.1; 455/343.2; 455/343.3; 455/41.2; 455/507; 370/311
(58) Field of Search ............................. 455/574, 343.1, 455/343.2, 343.3, 343.5, 41.2, 41.3, 507; 370/311

(56) References Cited

U.S. PATENT DOCUMENTS

| | | | | |
|---|---|---|---|---|
| 4,449,248 A | * | 5/1984 | Leslie et al. ................ | 340/7.36 |
| 5,682,379 A | * | 10/1997 | Mahany et al. ............. | 370/311 |
| 6,192,230 B1 | * | 2/2001 | van Bokhorst et al. .. | 455/343.3 |
| 2002/0090914 A1 | * | 7/2002 | Kang et al. ................... | 455/41 |
| 2003/0124979 A1 | * | 7/2003 | Tanada et al. ................ | 455/41 |
| 2003/0220076 A1 | * | 11/2003 | Katayama et al. ......... | 455/41.2 |

FOREIGN PATENT DOCUMENTS

JP            4-241533        8/1992

* cited by examiner

*Primary Examiner*—Sonny Trinh
*Assistant Examiner*—Huy Phan
(74) *Attorney, Agent, or Firm*—Finnegan, Henderson, Farabow, Garrett & Dunner, L.L.P.

(57) ABSTRACT

An object of the present invention is to prevent from concentrating communication on one terminal, thereby avoiding an increase in power consumption and thereby prolonging the network configuration time when forming a network by a plurality of devices. A wireless communication device Pa established as a master receives battery information including battery remaining amount, communication possible time, a possibility of becoming a master, from wireless communication devices Pb, Pc, Pd established as slaves within a wireless network, and decides a candidate terminal for the next master based on the battery information. A master/slave switching instruction is issued to a candidate terminal for the next master from the wireless communication device Pa, under a master/slave switching condition, when the battery remaining amount of the master becomes the established value or less, and the like. This can prevent from concentrating communication on one terminal, so to make the power consumption of the respective terminals uniform and prolong the configuration time of the wireless network.

25 Claims, 5 Drawing Sheets

BATTERY INFORMATION

| SLAVE ID | BATTERY REMAINING AMOUNT | COMMUNICATION POSSIBLE TIME | POSSIBILITY OF MASTER/SLAVE SWITCHING |
|---|---|---|---|

FIG. 5

LIST

| PRIORITIES | SLAVE ID | BATTERY REMAINING AMOUNT | COMMUNICATION POSSIBLE TIME | POSSIBILITY OF MASTER/SLAVE SWITCHING |
|---|---|---|---|---|
| 1 | 0306 | 80% REMAIN | 8 HOURS | POSSIBLE |
| 2 | 0185 | 50% | 5 HOURS | POSSIBLE |
| 3 | 0249 | 20% | 2 HOURS | POSSIBLE |

FIG. 6

COMMUNICATION SYSTEM, AND COMMUNICATION DEVICE AND COMMUNICATION METHOD FOR USE IN THE COMMUNICATION SYSTEM

CROSS-REFERENCE TO RELATED APPLICATIONS

This application is based upon and claims the benefit of priority from the prior Japanese Patent Application No. 11-280649, filed Sep. 30, 1999, the entire contents of which are incorporated herein by reference.

BACKGROUNDS OF THE INVENTION

The present invention relates to a communication system for performing data communication between one master unit and a plurality of slaves, for example, in an office or at home, and it relates to a communication device and a communication method for use in this communication system.

In a wireless network formed by a plurality of wireless communication terminals, by setting one master and a plurality of slaves, mutual wireless data communication can be established between the master and the respective slaves. For example, the Japanese Patent Publication Laid-Open No. 4-241533 describes that a wireless network is established between one master and a plurality of slaves, so to perform time division multiplexing communication between each terminal.

Considering the case of data communication between one master and a plurality of slaves, from the viewpoint of a slave, communication between the master and itself means one-to-one communication and the slave is only to sent and receive data at the time slot of its own. The master, however, must send and receive data to and from all the slaves. Therefore, it takes much more time to send and receive the data compared with the slave. In this case, relationship between a master and slaves is fixed in the conventional system, and it is impossible to change the relationship. Therefore, a role of a master is always concentrated on one, and the power consumption of this terminal becomes greater than any other terminal (slave).

As mentioned above, in the case of data communication between one master and a plurality of slaves, communication load is extremely increased in a terminal established as a master. Therefore, in the case of activating each terminal on battery, battery is exhausted soon in a terminal established as a master, and this terminal must leave the wireless network because of the battery exhaustion.

More specifically, assuming that, for example, in a conference hall, each participator carries his or her portable personal computer provided with a wireless communication function, and that, with a personal computer of a participator regarded as a master and the personal computers of the other participators regarded as slaves, the master computer receives data from each slave computer and sends the received data to each slave computer, communication concentrates on the personal computer first established as a master. Therefore, the battery of this computer goes dead in a shorter time than that of any other slave computer of the other participators, thereby causing a problem that the participator of this computer cannot take part in the conference thereafter.

BRIEF SUMMARY OF THE INVENTION

In order to solve the above problem, an object of the present invention is to provide a communication system capable of prolonging the network configuration time, by avoiding an increase in power consumption caused by communication concentration on one terminal, in configuring a network among a plurality of devices, and further provide a communication device and a communication method for use in this communication system.

In order to above problem, the present invention provides a communication system forming a network at least by a first device for performing communication in a first communication form consuming a predetermined power and a second device for performing communication in a second communication form consuming smaller power than the first device, for performing data communication between the first device and the second device, in which a timing for switching the communication form between the first device and the second device is judged and the communication form of the first device is switched from the first communication form to the second communication form and the communication form of the second device is switched from the second communication form to the first communication form.

The switching timing of the communication form is judged based on, for example, the battery information indicating the battery state of the respective devices. More specifically, when the battery remaining amount of the first device becomes the established value or less, a switching request is issued to the second device, so as to switch the first device from the first communication form to the second communication form. Upon receipt of the switching request, the second device is switched to the first communication form, and the first device is switched to the second communication form. Thus the power consumption of the first device can be restrained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a view showing the structure of the battery information sent from the side of a slave.

FIG. 6 is a view showing one example of a battery information list created on the side of a master.

DETAILED DESCRIPTION OF THE INVENTION

Hereinafter, a preferred embodiment will be described with reference to the accompanying drawings.

Figure 1:
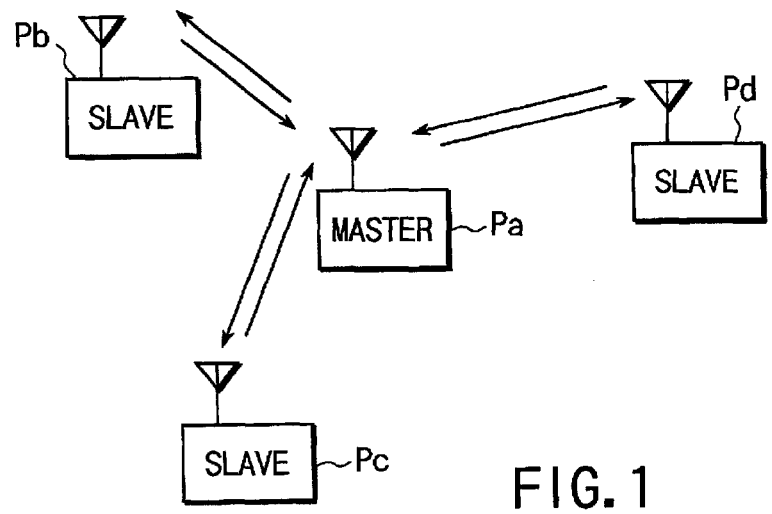
FIG. 1 is a view showing the structure of a communication system in accordance with one embodiment of the present invention.

FIG. 1 is a view showing the structure of a communication system in accordance with an embodiment of the present invention. The communication system of the present invention is to form a wireless network by one master and a plurality of slaves and to realize data communication by radio waves within a predetermined area. The master has a first communication form for performing data communication with each slave. The slave has a second communication form for performing one-to-one data communication with the master. The first communication form requires much more power than the second communication form.

Especially, the communication system of the present invention is effective in serving the same function in any terminal within a wireless network if any terminal becomes a master, in the case where, for example, in a conference hall, each participator carries his or her own personal computer provided with a wireless communication function, and that with a personal computer of a participator regarded as a master, and the personal computers of the other participators regarded as slaves, the computer of the master receives data from each personal computer of each slave and sends the received data to each personal computer of each slave.

As illustrated in FIG. 1, in this embodiment, a wireless network is formed by a plurality (four) of wireless communication devices Pa, Pb, Pc, Pd. These wireless communication devices Pa, Pb, Pc, Pd may be embodied by, for example, a portable terminal equipment such as a personal computer or a PDA (Personal Digital Assistant), respectively provided with a wireless communication function for realizing this system. As the wireless communication function, more specifically, a wireless LAN (Local Area Network) of 2.45 GHz or a Bluetooth system is used.

The Bluetooth system is a wireless communication system in accordance with the wireless communication standards of short-distance, and it is to realize the wireless communication of about 10 m by using radio waves of 2.45 GHz. This Bluetooth system can connect at maximum eight terminals, which form a network called a pico-net, with one terminal work as a master and the other terminals work as slaves. The terminals within the pico-net is authenticated by the password called PIN (Personal Identification Number) code.

Hereinafter, the description will be made in the case where, of the respective wireless communication devices Pa, Pb, Pc, Pd, with one defined as a master and the others defined as slaves, the master receives data of each slave and sends the data to each slave.

In the example of FIG. 1, the wireless communication device Pa is previously defined as a master, and the other wireless communication devices Pb, Pc, Pd are previously defined as slaves. The wireless communication device Pa that is the master, sends and receives data to and from the wireless communication devices Pb, Pc, Pd that are slaves as the communication parties. The respective wireless communication devices Pb, Pc, Pd that are slaves perform one-to-one data transmission/reception toward the wireless communication device Pa as the communication party.

Figure 2:
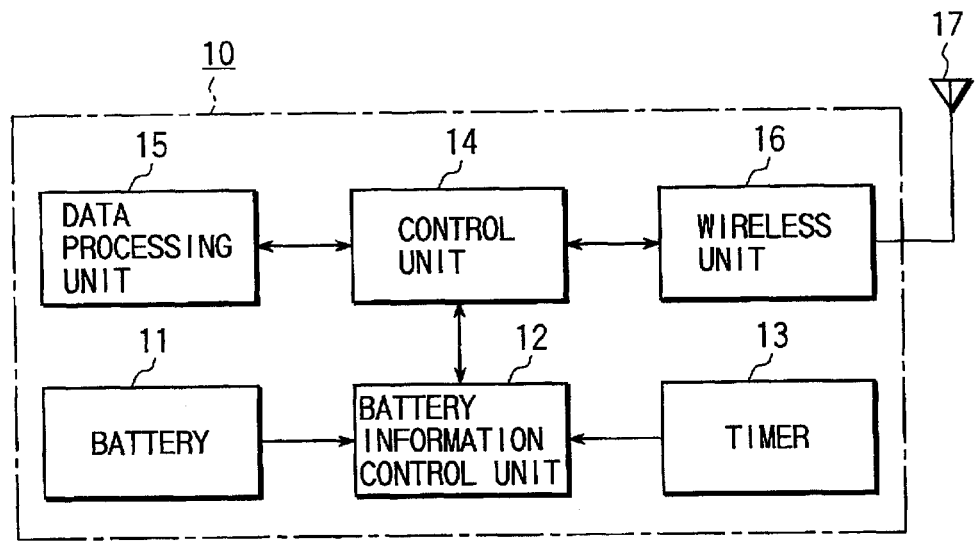
FIG. 2 is a block diagram showing the internal structure of a wireless communication device used as a master or a slave in the above communication system.

FIG. 2 is a block diagram showing the internal structure of the respective wireless communication devices Pa, Pb, Pc, Pd. The common structure of the respective wireless communication devices Pa, Pb, Pc, Pd is shown here.

The system body 10 of the respective wireless communication devices Pa, Pb, Pc, Pd is provided with a battery 11 as a driving power, a battery information control unit 12 for controlling the state of the battery 11, a timer 13 for clocking the time, a control unit 14 for controlling the whole system, a data processing unit 15 for processing the transmission/reception data, and a wireless unit 16 for realizing wireless communication.

The respective wireless communication devices Pa, Pb, Pc, Pd operate by the battery 11 as the driving source. The battery 11 is to supply power to each unit within the system body 10, and the remaining amount is monitored by the battery information control unit 12. The battery information control unit 12 stores the lowest limit of the battery remaining amount established by the control unit 14, and when the remaining amount of the battery 11 reaches the above lowest limit, it supplies the information to that effect, to the control unit 14. The battery information control unit 12 is provided with a function of giving information about the remaining communication possible time that is assumed from the battery remaining amount, to the control unit 14 and a function of giving the elapse time since becoming a master, which is obtained by the timer 13, to the control unit 14. Also the unit 12 can store and control the battery information sent from the other wireless communication devices.

The control unit 14 is to perform a data sending/receiving control within a wireless network, provided with a battery information obtaining function for obtaining battery information of each device, a master candidate deciding function for deciding a slave that becomes the next master, a discriminating function for discriminating the switching timing of master/slave, a switching instruction issuing function for issuing a master/slave switching instruction to a slave that becomes the next master, and a communication control function for performing data communication in the first communication form or the second communication form by switching the roles of a master and a slave.

The control unit 14 decides the timing of data transmission/reception within the wireless network, based on the network information (in the case of a master, the information indicating each ID of all the slaves within the network and the sending/receiving timing of each slave and itself; in the case of a slave, the information indicating the ID of a master within the network and the data sending/receiving timing of the master and itself).

Namely, the control unit 14 controls the wireless unit 16 so as to transmit the data sent from the data processing unit 15, at a predetermined timing. The wireless unit 16 modulates the data signal sent from the control unit 14 into wireless waves of a predetermined frequency band (for example, 2.45 GHz) so to send the same at the timing decided by the control unit 14 via an antenna 17. Further, the control unit 14 controls the wireless unit 16 so as to receive the data from another wireless communication device at the predetermined time slot. The wireless unit 16 demodulates the wireless waves received from the other wireless communication device via the antenna 17 into signals which can be processed by the data processing unit 15, so to send the same to the data processing unit 15.

Figure 3:
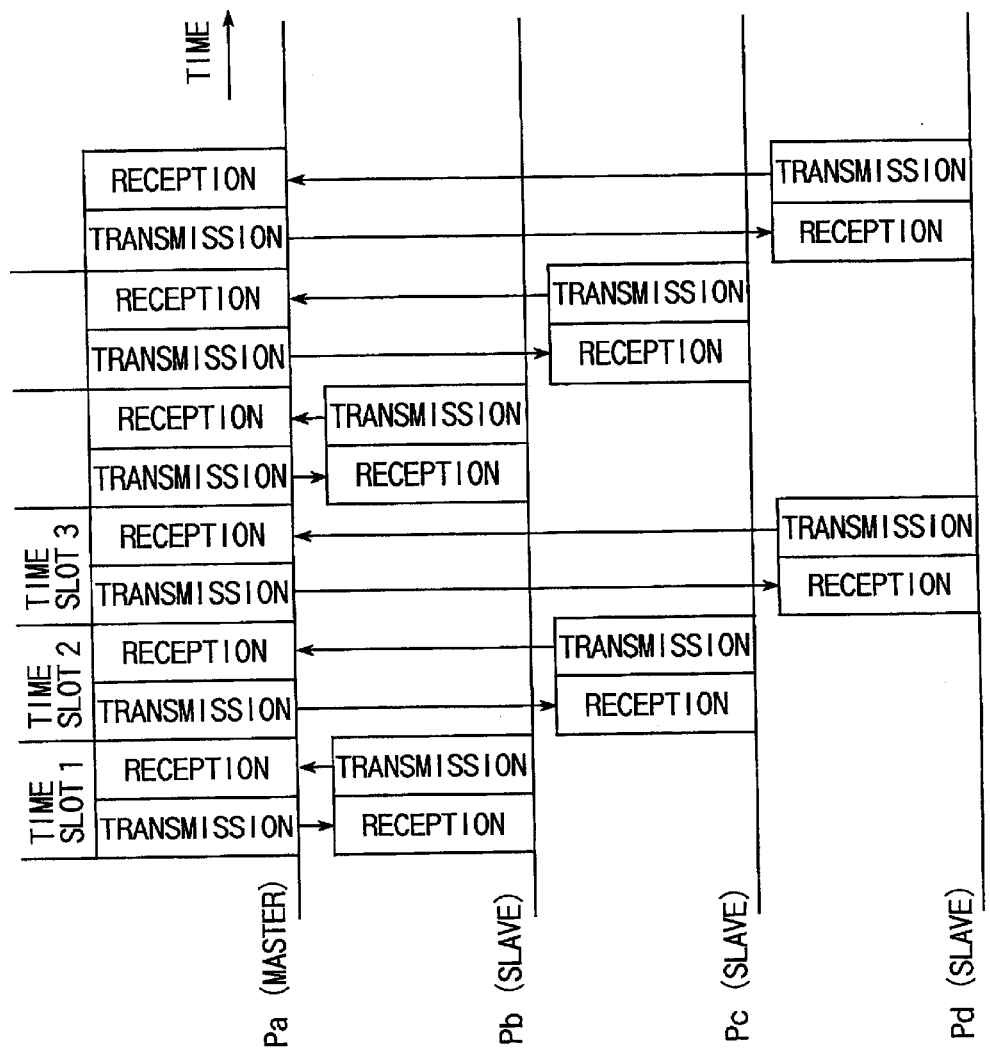
FIG. 3 is a timing chart for use in describing the time division multiplexing communication among the master and the respective slaves in the above communication system.

This state will be shown in FIG. 3.

FIG. 3 is a timing chart for use in describing the time division multiplexing communication among the respective wireless communications devices Pa, Pb, Pc, Pd.

Assume that the wireless communication device Pa is defined as a master and the other wireless communication devices Pb, Pc, Pd are defined as slaves. That the current master is the wireless communication device Pa is defined in the network information stored within the respective control units 14 of the respective wireless communication devices Pb, Pc, Pd, and the respective wireless communication devices Pb, Pc, Pd can perform one-to-one communication toward the wireless communication device Pa that is the master, according to the network information.

Data transmission/reception is performed between the master and the respective slaves in the time division multiplexing communication method. Namely, the wireless communication device Pa that is the master performs one-to-one data transmission/reception as for the wireless communication device Pb at the time slot 1, the wireless communication device Pc at the time slot 2, the wireless communication device Pd at the time slot 3. Hereinafter, this will be similarly repeated in every time slot.

The wireless communication devices Pb, Pc, Pd that are the slaves perform data transmission/reception only when the order of the time slot of it own comes, while the wireless communication device Pa that is the master always performs data transmission/reception with one of the slaves. Therefore, the master spends a lot of times in data transmission/reception, compared with the slave, which results in an increase of power consumption in the master, as mentioned above.

In order to solve this problem, the relationship between the master and the slaves is properly switched among the respective terminals within a network, thereby preventing communication from concentrating only on one terminal and making uniform each power consumption of each terminal.

Hereinafter, the procedure in the case of switching the relationship between a master and slaves within a network will be described.

Figure 4:
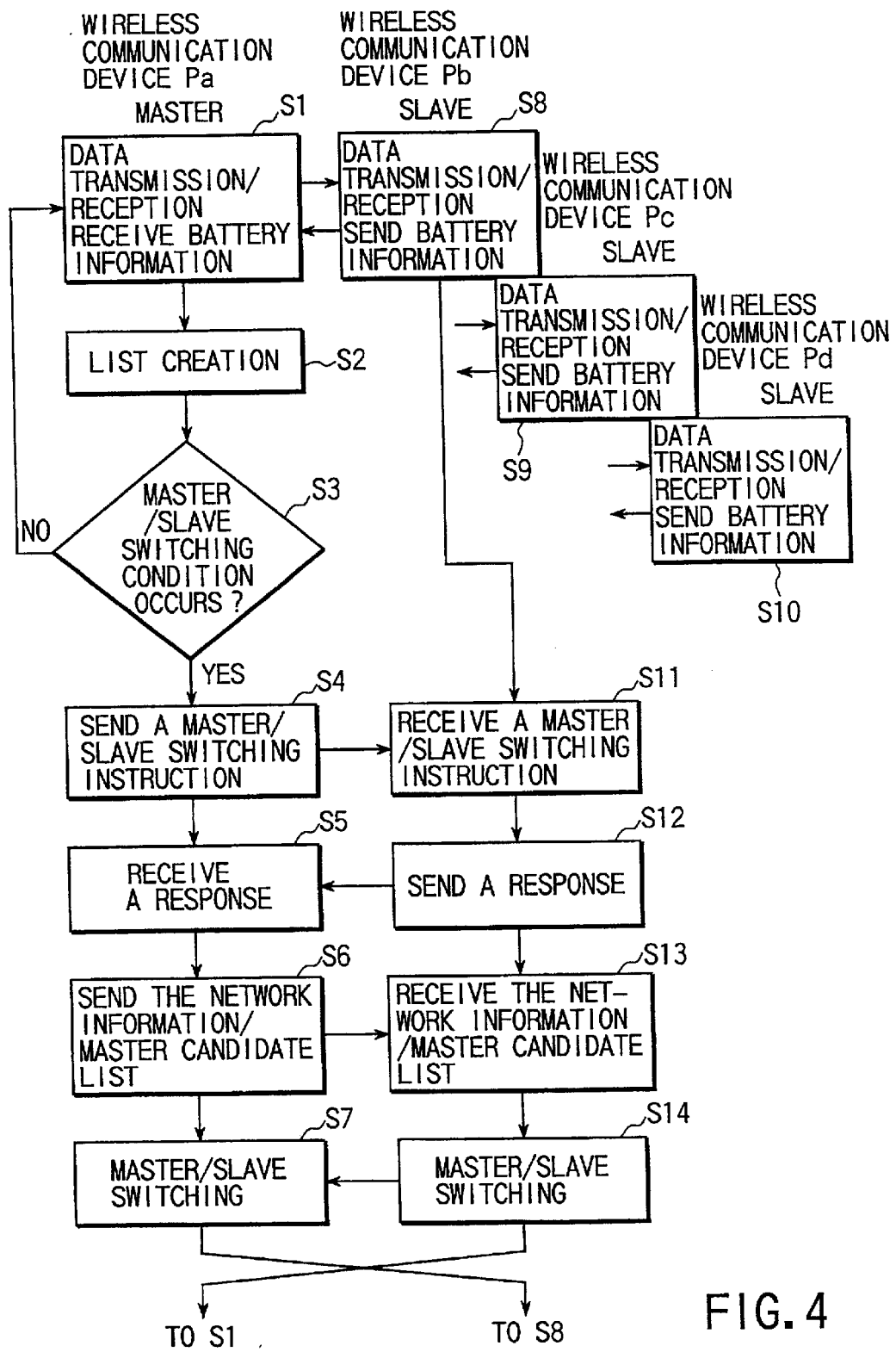
FIG. 4 is a flow chart showing the procedure of changing the role of the master and the slave in the above communication system.

FIG. 4 is a flow chart showing the procedure in the case of switching the relationship between a master and slaves.

Assume that the wireless communication device Pa is defined as a master and the wireless communication devices Pb, Pc, Pd are defined as slaves. As mentioned above, that the current master is the wireless communication device Pa is defined in the network information stored in the respective control units 14 of the respective wireless communication devices Pb, Pc, Pd, and the respective communication devices Pb, Pc, Pd can perform one-to-one communication with the wireless communication device Pa that is the master, according to the network information.

The wireless communication devices Pa, Pb, Pc, Pd within a wireless network are respectively provided with a function as a master simultaneously. Although each device performs data communication only with a master when each is set as a slave, it can perform data communication with the respective terminals newly set as the slaves within the wireless network when it is switched from a slave to a master by the following master/slave switching.

As illustrated in Steps S1, S8, S9, S10 in FIG. 4, data transmission/reception is performed between the wireless communication device Pa that is the current master, and the respective wireless communication devices Pb, Pc, Pd that are the current slaves, in the time division multiplexing method described in the above-mentioned FIG. 3.

The respective wireless communication devices Pb, the communication possible time varies depending on the use environment (for example, in the case of sending and receiving image data) even if the battery remaining amount is the same, it is preferable to require the communication possible time in consideration of the type of the current data. Whether it is possible or not to become a master is decided by a possibility of being switched to a master on the side of a slave as mentioned below.

When the wireless communication device Pa that is the master receives the battery information sent from the wireless communication devices Pb, Pc, Pd that are the slaves (Step S1), it creates a list as shown in FIG. 6 and decided a candidate for the next master, based on the battery information (Step S2). The candidate for the master is decided based on the battery remaining amount and the communication possible time included in the battery information of the respective slaves. For example, of the respective slaves, a terminal having the largest battery remaining amount is decided as the next master, or a terminal having the longest communication possible time is decided as the next master.

In this embodiment, the priorities are decided based on the battery remaining amount, and a terminal having the largest battery remaining amount, of all the terminals, that is the wireless communication device of the ID "0306" (here, Pc, Pd that are the slaves send the data from the data processing unit 15 as well as the battery information from the battery information control unit 12 to the wireless communication device Pa that is the master, according to the time slot respectively assigned. In this case, it is (a) at regular intervals of hour, (b) when the remaining amount of the battery 11 becomes the established value and less, (c) when a sending request of the battery information is issued by the master that the battery information is sent by the wireless communication devices Pb, Pc, Pd that are the slaves.

This battery information includes the ID of a slave, the battery remaining amount, the communication possible time, and the information about whether it is possible or not to become a master, as illustrated in FIG. 5. The ID is the inherent identification information for the respective wireless communication devices Pa, Pb, Pc, Pd, managed in each control unit 14. The battery remaining amount and the communication possible time can be required by the battery information control unit 12. There are various methods for requiring the battery remaining amount, and the present invention is not restricted to a specific method. The communication possible time is calculated based on the battery remaining amount. However, since assuming that it is the wireless communication device Pb) is decided as the candidate for the next master.

The wireless communication devices Pb, Pc, Pd that are the slaves receive the battery information of the wireless communication device Pa that is the master, and by comparison between the battery remaining amount included in the battery information of the master and the battery remaining amount of each slave itself, when the battery remaining amount of the master is much more, they can inform the master that they cannot become a master, and when the battery remaining amount of the master is less than that of a slave, the slave can inform the master that it can become a master (master/slave switching possibility in the battery information as shown in FIG. 5).

Next, the wireless communication device Pa that is the master judges whether a master/slave switching condition occurs or not (Step S3). In this case, the wireless communication device Pa sets the master/slave switching condition in the control unit 14 and the battery information control unit 12 in advance.

The master/slave switching condition includes;

(1) the elapse time since becoming a master, (2) the battery remaining amount, (3) the communication possible time.

As for the above condition (1), the time for switching the master/slave is previously established. The battery information control unit 12 judges that the elapse time since becoming a master reaches the above established time, it sends the information to that effect to the control unit 14. The control unit 14, upon receipt of the information, issues a master/slave switching instruction to a candidate slave for the next master decided based on the above list, through the wireless unit 16. The elapse time since becoming a master is clocked by the timer 13.

As for the above condition (2), the lowest limit of the battery remaining amount for switching the master/slave is previously established. When the battery information control unit 12 judges that the remaining amount of the battery 11 becomes the above established limit or less, it sends the information to that effect to the control unit 14. Upon receipt of the information, the control unit 14 issues the master/slave switching instruction to a candidate slave for the next master decided based on the above list through the wireless unit 16.

As for the above condition (3), the lowest limit of the communication possible time for switching the master/slave is previously established. When the battery information control unit 12 calculates the communication possible time depending on the remaining amount of the battery 11 and judges that it becomes the above established limit or less, the unit 12 sends the information to that effect to the control unit 14. Upon receipt of the information, the control unit 14 issues the master/slave switching instruction to a candidate slave for the next master decided based on the above list, through the wireless unit 16.

Although the communication possible time is primarily based on the battery remaining amount, the communication possible time varies depending on the use environment (for example, in the case of sending and receiving image data) even if the battery remaining amount is the same. Therefore, it is preferable to require the communication possible time in consideration of the type of the current data.

If a terminal becomes a master again after switching the master/slave, the above lowest limit will be reset again.

When no master/slave switching condition occurs in the wireless communication device Pa that is the master in the above Step S3, this step will be returned to the above Step S1, where the wireless communication device Pa continues the data transmission/reception toward the respective slaves as the master. While, when the master/slave switching condition occurs in the wireless communication device Pa that is the master in the above Step S3, the wireless communication device Pa that is the master sends the master/slave switching instruction to a candidate slave for the next master (here, the wireless communication device Pb), based on the above list (Step S4).

Upon receipt of the master/slave switching instruction (Step S11) on the side of the slave, the wireless communication device Pb returns the response signal to the effect of accepting this master/slave switching instruction, to the wireless communication device Pa that is the master of the sending source (Step S12). The wireless communication device Pa that is the master performs the master/slave switching processing, upon receipt of this response signal.

More specifically, the wireless communication device Pa that is the current master sends the network information owned by itself and the battery information list created in the above Step S2 to the wireless communication device Pb that will become the next master (Step S6). Upon receipt of the network information and the battery information list from the wireless communication device Pa that is the current master (Step S13), thereafter the wireless communication device Pb that will become the next master would operate as the master within the wireless network based on the received network information (Step S14), and execute the processing from Step S1. Operating as the master means that data communication is performed through the respective slaves as the communication parties. Simultaneously, the wireless communication device that has been the master thereafter would operate as a slave (Step S7), and execute the processing from Step S8. Operating as a slave means that one-to-one data communication is performed with the master as the communication party.

The wireless communication device Pb that becomes a new master, when the master/slave switching occurs, sends the network information with that effect defined there, to the other wireless communication devices Pc, Pd that are the slaves. Thus, the wireless communication devices Pc, Pd can perform one-to-one data communication with the wireless communication device Pb that is a new master. Since the wireless communication device Pa that has been the master knows that the next master is the wireless communication device Pb, it thereafter performs one-to-one communication with the wireless communication device Pb that is the new master.

Figure 7:
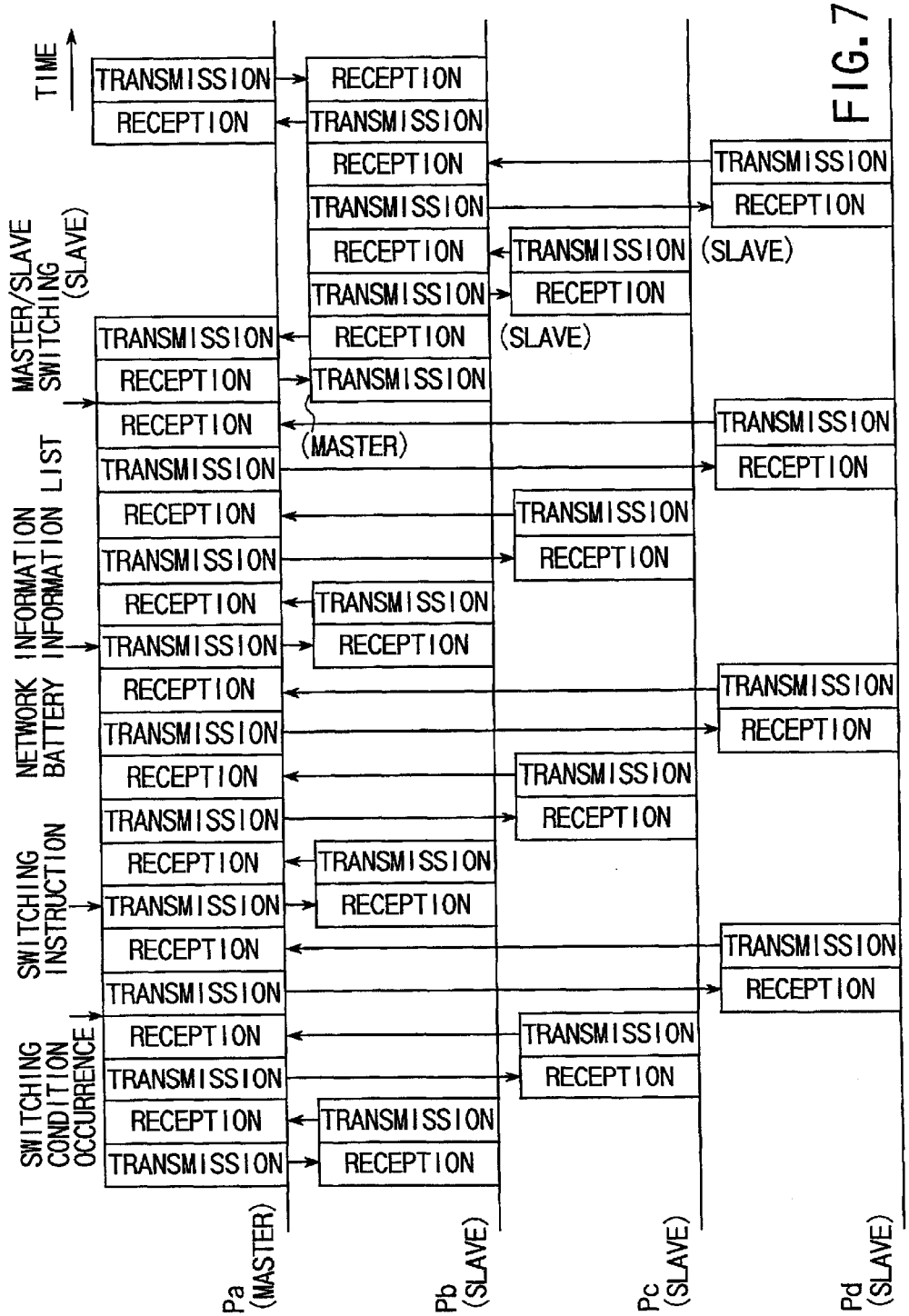
FIG. 7 is a timing chart showing the master and slave switching in the above communication system.

This state is shown in FIG. 7.

FIG. 7 is a timing chart showing the master/slave switching.

At first, the wireless communication device Pa operates as a master and performs time division multiplexing communication with the wireless communication devices Pb, Pc, Pd that are the slaves. Namely, data transmission/reception is performed through the respective slaves at every predetermined time slot.

The wireless communication device Pa that is the master obtains the respective battery information from the wireless communication devices Pb, Pc, Pd that are the slaves, and based on the battery information, it decides a candidate for the next master. Here, the next master is decided as the wireless communication device Pb. It is at regular intervals of time, when the battery remaining amount of a slave becomes the established limit or less, and when a battery information sending request is issued by the master, as described in the above (a) to (c), that the respective slaves send the battery information of their own to the master.

When the master/slave switching condition occurs in the wireless communication device Pa that is the master, the wireless communication device Pa that is the master issues the master/slave switching instruction to the wireless communication device Pb at the time of communicating with the wireless communication device Pb that is a candidate for the next master at the timing as shown in FIG. 7. As the master/slave switching condition, there are the elapse time since becoming a master, the battery remaining amount, and the communication possible time as described in the above (1) to (3).

The wireless communication device Pb receiving the master/slave switching instruction returns a response to the wireless communication device Pa and accepts the master/slave switching instruction. Thereafter, since the master/slave switching is not completed, the wireless communication device Pa still communicates with the wireless communication devices Pc, Pd as the master.

Next, when the wireless communication device Pa communicates with the wireless communication device Pb, it sends the network information and battery information list which the wireless communication device Pa owns, to the wireless communication device Pb. The transmission/reception timing is switched at the timing shown in FIG. 7 in the wireless communication device Pa and the wireless communication device Pb, thereby replacing the role of the master/slave.

Thereafter, the wireless communication device Pb operates as the master based on the network information handed from the wireless communication device Pa and the wireless communication device Pa operates as a slave. At this time, the wireless communication device Pb of the new master notifies the other wireless communication devices Pc, Pd that are the slaves that the device Pb itself is the master. Thus, the wireless communication devices Pc, Pd recognize that the wireless communication device Pb is the new master, and change the communication party to the wireless communication device Pb, so to perform the data communication.

In the present embodiment, since the respective slaves perform data communication only with the master, the master/slave switching instruction can be usually accepted on the side of the slave when the master issues a master/slave switching instruction to a slave selected as the next master. However, when the slave is not in a position to accept the master/slave switching instruction in some reason, it is preferably for the master to take a countermeasure such as issuing the master/slave switching instruction to the next candidate slave for the next master, according to the priorities of the list of FIG. 6.

Although the description has been made, in the present embodiment, on assumption that a master/slave switching instruction is automatically sent to a wireless communication device that becomes the next master when a master/slave switching condition occurs in the wireless communication device that is the master, for example, it is also possible to issue the master/slave switching instruction, for example, by such a predetermined operation that when a master/slave switching condition occurs in the wireless communication device that is the master, the master notifies that effect to the user of the corresponding device through display of a message and the user presses the master/slave switching button. In this case, the sending destination is the slave that becomes the next master decided based on the list of FIG. 6.

In these ways, if a master/slave switching condition occurs in the master, the role of the master/slave is switched to a slave within the wireless network, thereby preventing the role of a master (data communication with the respective slaves in the first communication form) from concentrating on a terminal and restraining the power consumption thereof. In short, the respective terminals forming a wireless network take turns providing the role of a master, which makes the power consumption of the respective terminals uniform.

Accordingly, when, for example, in a conference hall, each participator carries his or her portable personal computer provided with a wireless communication function, and with a personal computer of a participator regarded as a master and the personal computers of the other participators regarded as slaves, the master computer receives data from each slave computer and sends the received data to each slave computer, if the master computer is running short of the battery, the role of the master can be replaced by the personal computer of the other participator, thereby previously preventing from the battery exhaustion, which results in prolonging the configuration hour of the wireless network.

Although the above embodiment has been described in the case of wirelessly configuring a network by each terminal, the present invention is not restricted to the wireless communication, but it is applicable to a network consisting of each terminal connected by wire.

As set forth hereinabove, according to the present invention, a terminal established as a master receives the respective battery information from the respective terminals established as slaves in a network, decides a terminal that will become the next master, based on the battery information, and sends a master/slave switching instruction to the terminal that will become the next master so as to switch the role of the master and the slave among the respective terminals, thereby preventing from concentrating communication on a terminal and restraining the power consumption. Therefore, for example, when a master receives data from the respective slaves and sends the data to the respective slaves, the role of a master is switched to another terminal if the master is becoming short of the battery, thereby previously preventing from battery exhaustion of the master terminal and prolonging the configuration hour of a network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system having a first device for performing communication in a first communication form that consumes a predetermined power and a second device for performing communication in a second communication form that consumes a smaller power than the first device, wherein the first and second communication forms are performed in the same network, for performing data communication between the first device and the second device, comprising:

means for judging a timing for switching the communication form between the first device and the second device; and means for switching the communication form of the first device from the first communication form to the second communication form and switching the communication form of the second device from the second communication form to the first communication form, when said judging means judges that it is the switching timing.

2. A communication system according to claim 1, further comprising:

means for sending battery information indicating a state of its own battery from the second device to the first device at a predetermined timing; and means for deciding the second device as an object device based on the battery information from the second device, so as to switch the first device from the first communication form to the second communication form;

wherein the judging means comprises:

means for judging that it is a timing of switching the first communication form and the second communication form between the first device and the second device depending on the battery state of the first device; and means for sending a switching instruction from the fist device to the second device when said judging means judges that it is the switching timing; and the switching means comprises means for switching the second device receiving the switching instruction sent by said switching instruction sending means, from the second communication form to the first communication form, and switching the first device from the first communication form to the second communication form.

3. A communication system according to claim 2, wherein the first device is provided with means for performing communication by radio wave, the second device is provided with means for performing communication by radio waves with said performing means provided with the first device and a communication between the first device and the second device is performed by using the performing means provided with first and second devices.

4. A communication method in a communication system having a first device for performing communication in a first communication form that consumes a predetermined power and a second device for performing communication in a second communication form that consumes a smaller power than the first device, wherein both of the first and second communication forms are performed in the same network, for performing data communication between the first device and the second device, comprising the steps of:

judging a timing for switching the communication form between the first device and the second device; and switching the communication form of the first device from the first communication form to the second communication form and switching the communication form of the second device from the second communication form to the first communication form, when the timing for switching is judged.

5. A communication method according to claim 4, further comprising the steps of:
sending battery information indicating the state of its own battery from the second device to the first device at a predetermined timing; and
deciding the second device as an object device based on the battery information from the second device, so as to switch the first device from the first communication form to the second communication form, wherein
the step of judging comprises:
judging that it is a timing of switching the first communication form and the second communication form between the first device and the second device depending on the battery state of the first device; and
sending a switching instruction from the first device to the second device when said judging means judges that it is the switching timing; and
the step of switching comprises switching the second device from the second communication form to the first communication form, and switching the first device from the first communication form to the second communication form.

6. A communication method according to claim 5, wherein the first device is provided with means for performing communication by radio wave, the second device is provided with means for performing communication by radio waves with said performing means provided with the first device and a communication between the first device and the second device is performed by using the performing means provided with the first and second devices.

7. A communication device for performing communication in a first communication form that consumes much more power than other devices for performing communication in an other communication form, wherein the communication form and the other communication form are performed in the same network, for performing data communication among the other communication devices, comprising:
means for deciding an object device from the other devices so as to switch the communication form performed by the above communication device to the other communication form of the other device;
means for judging that it is a timing of switching the communication form; and
means for switching the communication form to that of the object device decided by said deciding means when said judging means judges that it is the switching timing.

8. A communication device according to claim 7, further comprising:
means for controlling its own battery state; and
means for obtaining battery information indicating the battery state of the other devices;
wherein the deciding means decides an object device from the other devices so as to switch the communication form performed by the same communication device to the communication form of the other device, based on the battery information from the other devices obtained by said battery information obtaining means;
the judging means judges that it is a timing of switching the communication form depending on its own battery state controlled by said battery control means and the switching means switches the communication form between the object device decided by said deciding means and itself when said judging means judges that it is the switching timing.

9. A communication device according to claim 8, wherein the communication device is provided with means for performing communication by radio wave, the other device is provided with means for performing communication by radio waves with said performing means provided with the communication device and a communication between the communication device and the other device is performed by using the performing means provided with the communication device and other device.

10. A communication method for performing communication in a communication form that consumes much more power than other devices performing communication in an other communication form, wherein the communication form and the other communication form are performed in the same network, for performing data communication among the other communication devices, comprising the steps of:
obtaining battery information indicating the battery state of the other devices;
deciding an object device from the other devices so as to switch the communication form performed by the same communication device to the communication form of the other device, based on the battery information from the other devices;
judging that it is a timing of switching the communication form depending on its own battery state; and
switching the communication form between the object device decided by said deciding means and itself, when the timing for switching is judged.

11. A communication device for performing data communication either in a first communication form that consumes a first power or in a second communication form that consumes a second power that is smaller than the first power, wherein both of the first and second communication forms are performed in the same network, comprising:
means for judging that it is a timing of switching the first communication form and the second communication form; and
means for switching the communication form between the first communication form and the second communication form when said judging means judges that it is the timing for switching the communication form.

12. A communication method for performing data communication either in a first communication form consuming a first power or in a second communication form consuming a second power that is smaller than the first power, wherein both of the first and second communication forms are performed in the same network, comprising the steps of:
judging that it is a timing of switching the first communication form and the second communication form; and
switching the communication form between the first communication form and the second communication form when the timing for switching is judged.

13. A communication system having a master and a plurality of slaves, the master having a first communication form for performing data communication with the respective slaves, the respective slaves having a second communication form for performing one-to-one data communication with the master, wherein both of the first and second communication forms are performed in the same network, comprising the steps of:
sending battery information controlled by the respective slaves, from respective terminals established as the slaves to a terminal established as the master, at a predetermined timing;

deciding a candidate slave for the next master based on the battery information on the side of the master terminal;

sending a master/slave switching instruction from the master terminal to the candidate slave terminal for the next master when a master/slave switching condition occurs in the master terminal; and switching the first communication form and the second communication form between the respective terminals so that upon receipt of the master/slave switching instruction, the terminal that was the slave operates as the master and the terminal that was the master operates as the slave.

14. A communication system as claimed in claim 13, wherein the respective terminals established as the slaves send the battery information to the master terminal at regular intervals.

15. A communication system as claimed in claim 13, wherein the respective terminals established as the slaves send the battery information to the master terminal when battery remaining amount becomes established value or less.

16. A communication system as claimed in claim 13, wherein the respective terminals established as the slaves send the battery information to the master terminal according to a request from the master.

17. A communication system as claimed in claim 13, wherein the battery information includes information indicating the remaining amount of the battery owned by the slave, and the terminal established as the master decides a terminal having the largest battery remaining amount as the next master based on the battery information.

18. A communication system as claimed in claim 13, wherein the battery information includes information indicating communication possible time of the slave, and the terminal established as the master decides a terminal having the longest communication possible time as the next master based on the battery information.

19. A communication system as claimed in claim 13, wherein the master/slave switching condition includes elapse time since becoming the master, and the terminal established as the master sends a master/slave switching instruction to a candidate slave terminal for the next master, so as to switch the master terminal from the first communication form to the second communication form when the elapse time since becoming the master reaches the established value.

20. A communication system as claimed in claim 13, wherein the master/slave switching condition includes battery remaining amount of the master, and the terminal established as the master sends a master/slave switching instruction to a candidate slave terminal for the next master, so as to switch the master terminal from the first communication form to the second communication form when the battery remaining amount of the master itself becomes established value or less.

21. A communication system as claimed in claim 13, wherein the master/slave switching condition includes communication possible time of the master, and the terminal established as the master sends a master/slave switching instruction to a candidate slave terminal for the next master, so as to switch the master terminal from the first communication form to the second communication form when the communication possible time of the master itself becomes established value or less.

22. A communication device for use in a communication system having one master and a plurality of slaves, the master having a first communication form for performing data communication with the respective slaves, the respective slaves having a second communication form for performing one-to-one data communication with the master, wherein both of the first and second communication forms are performed in the same network, comprising:

means for obtaining battery information of respective terminals established as the slaves for performing data communication in the second communication form within the wireless net work when the above communication device is established as the master for performing data communication in the first communication form;

means for deciding a candidate slave for the next master based on the battery information obtained by said battery information obtaining means;

means for issuing a master/slave switching instruction to a candidate slave for the next master decided by said master candidate deciding means when a master/slave switching condition occurs; and means for switch ing a role from the master to the slave upon receipt of a response to the master/slave switching instruction issued by said switching instruction issuing means from the candidate slave for the next master, and thereafter performing data communication with the terminal established as a new master within the wireless network as a communication party in the second communication form.

23. A communication device for use in a communication system having one master and a plurality of slaves, the master having a first communication form for performing data communication with the respective slaves, the respective slaves having a second communication form for performing one-to-one data communication with the master, wherein both of the first and second communication forms are performed in the same network, comprising:

a battery as a driving source:

means for controlling the state of said battery;

means for sending battery information controlled by said battery control means to a terminal established as the master for performing data communication in the first communication form within the wireless network when the above communication device is established as the slave for performing data communication in the second communication form;

means for receiving a master/slave switching instruction issued by a terminal established as the master based on the battery information sent by said battery information sending means; and means for switching a role from the slave to the master, after returning a response toward the master/slave switching instruction received by said switching instruction receiving means, to the terminal established as the master, and thereafter performing data communication with the respective terminals newly established as the slaves within the wireless network, as communication parties, in the first communication form.

24. A communication method of a communication device for use in a communication system having one master and a plurality of slaves, for performing data communication between the master and the respective slaves by radio waves, wherein the master and slaves communicate with each other in the same network, comprising the steps of:

obtaining battery information of respective terminals established as the slaves for performing data communication in the second communication form within the wireless network when the above communication device is established as the master for performing data communication in the first communication form;

deciding a candidate slave for the next master based on the battery information;

issuing a master/slave switching instruction to a candidate slave for the next master when a master/slave switching condition occurs; and switching a role from the master to the slave, upon receipt of a response to the master/slave switching instruction from the candidate slave for the next master, and thereafter performing data communication with the terminal established as a new master within the wireless network as a communication party in the second communication form.

25. A communication method of a communication device for use in a communication system having one master and a plurality of slaves, for performing data communication between the master and the respective slaves by radio waves in the same network, comprising the steps of:

sending battery information indicating the state of the battery owned by itself to a terminal established as the master for performing data communication in the first communication form within the wireless network when the above communication device is established as the slave for performing data communication in the second communication form;

receiving a master/slave switching instruction when the terminal established as the master based on the battery information issues the master/slave switching instruction for instructing the above communication device to become the next master; and switching a role from the slave to the master, after returning a response toward the master/slave switching instruction to the terminal established as the master, and thereafter performing data communication with the respective terminals newly established as the slaves within the wireless network, as communication parties, in the first communication form.

* * * * *

UNITED STATES PATENT AND TRADEMARK OFFICE
CERTIFICATE OF CORRECTION

PATENT NO. : 6,901,275 B1
DATED : May 31, 2005
INVENTOR(S) : Aoyagi

It is certified that error appears in the above-identified patent and that said Letters Patent is hereby corrected as shown below:

Column 10,
Line 29, change "form;" to -- form, --.
Line 36, change "fist" to -- first --.
Line 38, change "timing;" to -- timing, --.

Column 11,
Line 21, change "timing;" to -- timing, --.
Line 58, change "devices;" to -- devices, --.
Line 64, change "means;" to -- means, --.

Column 14,
Line 11, change "net work" to -- network --.
Line 22, change "switch ing" to -- swtiching --.

Signed and Sealed this

Twentieth Day of September, 2005

JON W. DUDAS
*Director of the United States Patent and Trademark Office*